: 3,318,881
NOVEL DIHYDROTHIENO[3,2-d]PYRIMIDINES
Gerhard Ohnacker and Eberhard Woitun, Biberach an der Riss, Germany, assignors to Boehringer Ingelheim G.m.b.H., Ingelheim am Rhine, Germany, a corporation of Germany
No Drawing. Filed June 8, 1964, Ser. No. 373,564
Claims priority, application Germany, July 4, 1962,
T 22,407
6 Claims. (Cl. 260—246)

ABSTRACT OF THE DISCLOSURE

Substitution products of dihydrothieno[3,2-d]pyrimidines and acid addition salts thereof which possess cardiovascular and sedative properties.

This is a continuation-in-part of copending application Ser. No. 288,491, filed June 17, 1963, now Patent No. 3,272,811.

This invention relates to novel substitution products of dihydrothieno[3,2-d]pyrimidine and to acid addition salts thereof, as well as to various methods of preparing these compounds.

More particularly, the present invention relates to novel dihydrothieno[3,2-d]pyrimidine substitution products of the formula

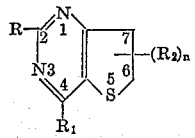

(I)

wherein R is hydrogen, halogen, lower alkyl, aryl or aralkyl, where the aryl radicals and the aromatic moiety of the aralkyl radicals may have halogen, lower alkyl, lower alkoxy, amino, monoalkylamino or dialkylamino substituents attached thereto, hydroxy, lower alkoxy, lower alkoxy-lower alkoxy, monoalkylamino-lower alkoxy, dialkylamino-lower alkoxy, aralkoxy, lower alkyl-mercapto, aralkyl-mercapto, aryl-mercapto, carbalkoxy-lower alkyl-mercapto, monoalkylaminoalkyl-mercapto, dialkylaminoalkyl-mercapto, or amino of the formula

wherein $R_3$ is amino, phenylamino, lower alkyl, hydroxy-lower alkyl, lower alkoxy-lower alkyl, lower alkyl-thio-lower alkyl, halo-lower alkyl, amino-lower alkyl, monoalkylamino-lower alkyl, dialkylamino-lower alkyl, lower alkenyl, aryl, aralkyl, cycloalkyl or pyridyl, $R_4$ is hydrogen, lower alkyl or hydroxy-lower alkyl, or $R_3$ and $R_4$, together with each other and the adjacent nitrogen atom, form a basic heterocyclic whose methylene chain may be interrupted by additional heteroatoms, such as oxygen, nitrogen and sulfur, and which may have lower alkyl or aryl substituents attached thereto, $R_1$ is hydrogen, halogen, hydroxy, lower alkoxy, lower alkoxy-lower alkoxy, monoalkylamino-lower alkoxy, dialkylamino-lower alkoxy, aralkoxy, lower alkenyloxy, mercapto, lower alkyl-mercapto, aryl-mercapto, aralkyl-mercapto, carbalkoxy-lower alkyl-mercapto, mono- alkyl-aminoalkyl-mercapto, dialkyl-aminoalkyl-mercapto, amino or a substituent of the formula

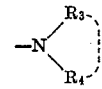

wherein $R_3$ and $R_4$ have the same meanings as defined above, $R_2$ is lower alkyl or aryl, where the aryl radical may have halogen, lower alkyl, lower alkoxy, amino, monoalkylamino or dialkylamino substituents attached thereto, and $n$ is an integer from 0 to 2, inclusive, and their non-toxic, pharmacologically acceptable acid addition salts.

The compounds of the present invention may be prepared by a number of different methods, but the following have proved to be the most convenient and efficient:

*Method A.*—Reaction of a tetrahydrothiophene compound of the formula

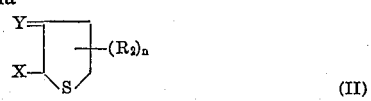

(II)

wherein $R_2$ and $n$ have the same meanings as in Formula I above, X is a reactive functional derivative of a carboxyl group and Y is oxygen or imino (=NH), with a compound of the formula

(III)

or an acid addition salt thereof or a tautomer of the formula

(IIIa)

wherein R has the same meanings as in Formula I and Z is oxygen or imino; however, Z in Formulas III and IIIa cannot be oxygen when Y in Formula II is oxygen, and vice-versa. Examples of reactive functional derivatives of the tetrahydrothiophene-carboxylic acids of Formula II are their esters, nitriles, amidines, amides or thioamides. Examples of particular compounds of the Formulas III and IIIa which may be used are urea, thiourea, O-alkyl-isoureas, S-alkyl-isothioureas, carboxylic acid amides and carboxylic acid amidines, such as formamide and formamidine, guanidine and substituted guanidines.

This particular method produces compounds of the Formula I wherein R and $R_2$ and $n$ have the previously indicated meanings and $R_1$ is either (a) hydroxyl, (b) mercapto or (c) a free amino group. For instance, compounds wherein $R_1$ is hydroxyl are obtained by starting from a tetrahydrothiophene compound II wherein X is carbalkoxy or carbamyl. On the other hand, compounds wherein $R_1$ is mercapto are obtained by starting from a tetrahydrothiophene compound II wherein X is a carboxylic acid thioamide radical. And compounds wherein $R_1$ is a free amino group are obtained by starting from a tetrahydrothiophene compound II wherein X is a cyano or amidine group.

The reaction is carried out at a temperature between 20 and 200° C., preferably at a pH of 8–10, and most advantageously by using about equimolar amounts of compounds II and III or IIIa in a solvent. The selection of the most advantageous reaction temperature depends upon the reactivity of compound III or IIIa; that is, while the reaction proceeds at room temperature with such compounds of the Formula III as amidines, guanidine, O-alkyl-isoureas or S-alkyl-isothioureas, the reaction temperature must be raised to between 100 and 200° C. when compound III is urea, thiourea or formamide, depending upon the reactivity of compound II.

The tetrahydrothiophene derivatives of the Formula II, which are used as starting materials in this method, are themselves prepared by the method described by R. B. Woodward and R. H. Eastman, J.A.C.S., 68, 2229–2235 (1946), that is, by reacting reactive derivatives of acrylic acid with reactive derivatives of thioglycolic acid, for instance, by reacting an acrylic acid alkyl ester with a thioglycolic acid alkyl ester in the presence of a basic condensation agent, or by the method of E. Larsson, Svensk. Chem. Tid., 57, 24 (1945).

*Method B.*—Reaction of a dihydrothieno-pyrimidine of the formula

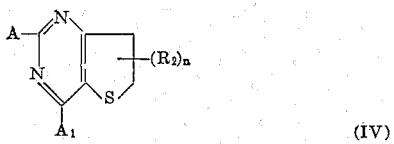

wherein $R_2$ and $n$ have the same meanings as in Formula I, and one of substituents A and $A_1$ is halogen or a free or lower alkyl-substituted mercapto group, and the other of substituents A and $A_1$ is halogen, mercapto, lower alkyl-mercapto or has any of the other meanings included in the definition of R and $R_1$ in Formula I above, with a compound of the formula $$R_5H \qquad (V)$$

wherein $R_5$ is hydroxyl, lower alkoxy, lower alkoxy-lower alkoxy, monoalkylamino-lower alkoxy, dialkylamino-lower alkoxy, aralkoxy, mercapto, lower alkyl-mercapto, aralkyl-mercapto, aryl-mercapto, carbalkoxy-lower alkyl-mercapto, monoalkylaminoalkyl-mercapto, dialkylamino-alkyl-mercapto or amino of the formula.

wherein $R_3$ and $R_4$ have the meanings defined above in connection with Formula I.

The reaction is advantageously performed in the presence of an inert organic solvent and at temperatures between 0 and 200° C. If one or both of substituents A and $A_1$ are halogen, it is necessary that the reaction be performed in the presence of a compound capable of tying up or neutralizing the hydrogen halide released by the reaction, for instance, in the presence of an inorganic base or a tertiary organic base. If $R_5$ in compound V is a basic radical

compound V itself may serve as the agent for tying up the hydrogen halide; under these circumstances compound V must, however, be provided in excess over the stoichiometric amount required for reaction with compound IV, preferably at least one molar excess. A still greater excess of this amine may also serve as the organic solvent medium for the reaction.

The reaction temperature depends largely upon the reactivity of the reactants. In general, the reaction involving the exchange of a halogen for any of the other indicated groups in the presence of a compound capable of tying up the hydrogen halide proceeds at room temperature or moderately elevated temperatures. On the other hand, if the reaction involves the exchange of a mercapto group for a substituent of the formula

the reaction proceeds at temperatures between 100 and 200° C. If compound V is one having a relatively low boiling point, the reaction is advantageously performed in a closed vessel.

In the event that $R_5$ in compound V is hydroxyl, mercapto, substituted hydroxyl or substituted mercapto, it is advantageous to react compound V with a compound of the Formula IV wherein A and/or $A_1$ are halogen. If it is desired to prepare compounds of the Formula I wherein R is lower alkyl, aryl or aralkyl, the reactant IV must be one wherein A is already lower alkyl, aryl or aralkyl.

If it is desired to prepare compounds of the Formua I wherein R and $R_1$ are identical substituents, the starting compound IV wherein A and $A_1$ are any of the above exchangeable radicals is reacted with twice the molar equivalent or a larger excess of compound V. However, it is also possible to introduce non-identical substituents R and $R_1$, for instance, by first exchanging $A_1$ for $R_1$ and then A for R on the dihydrothieno[3,2-d]pyrimidine nucleus.

Compounds of the Formula IV, which are used as starting materials in Method B, may be prepared by Method A. If substituents A and/or $A_1$ in Formula IV are mercapto or lower alkyl-mercapto, these compounds may be obtained directly by ring closure, for instance, by reacting a 3-imino-tetrahydrothiophene-2-carboxylic acid thioamide with thiourea. If one or both of substituents A and $A_1$ are to be halogen, a compound of the Formula II wherein X is a carbalkoxy group is first subjected to a ring closure reaction with urea to form the corresponding 2,4-dihydroxy-dihydrothieno[3,2-d]pyrimidine, which is then transformed into the corresponding 2,4-dihalo-dihydrothieno[3,2-d]pyrimidine, for example, with phosphorusoxychloride. The analogous 2,4-dimercapto compounds may also be obtained from the above-mentioned 2,4-dihydroxy-dihydrothieno[3,2-d]pyrimidines, namely, either by reacting the 2,4-dihydroxy compounds with phosphoruspentasulfide and subsequent alkylation, or through the 2,4-dihalo compounds by reacting the latter with thiourea, an alkali metal hydrosulfide or an alkali metal mercaptide.

If the reaction product of Method A or B is a compound of the Formula I wherein R is hydroxyl and/or $R_1$ is hydroxyl, mercapto or amino—which is always the case for $R_1$ when Method A is used—the hydrogen atoms of these groups may, if desired, be subsequently replaced by lower alkyl, alkoxy-lower alkyl, monoalkylamino-lower alkyl, dialkylamino-lower alkyl, carbalkoxy-lower alkyl or aralkyl according to known methods, for instance, by reaction with reactive esters of the corresponding alcohols, particularly with hydrohalic acid esters or sulfonic acid esters. Aryl and pyridyl radicals may, of course, not be introduced in this manner.

If the reaction product of Method A or B is a compound of the Formula I wherein one or both of substituents R and $R_1$ are mercapto or substituted mercapto, these may subsequently be exchanged for hydrogen by known methods, for instance, by hydrogenation in the presence of Raney nickel. In fact, compounds of the Formula I wherein $R_1$ is hydrogen can be obtained only by this method.

Compounds of the Formula I wherein one, two or all three of substituents R, $R_1$ and $R_2$ are or comprise basic radicals, that is, amino, substituted amino or basic heterocycles, may be readily converted into their acid addition salts by customary methods, namely, by dissolving the free base in a suitable solvent and acidifying the solution with the desired acid. Similarly, compounds of the Formula I wherein the substituents are free hydroxyl or mercapto groups may be converted into their alkali metal salts.

The following examples further illustrate the present invention and will enable others skilled in the art to understand the invention more completely. It should be understood, however, that the present invention is not limited solely to the illustrative examples given below.

EXAMPLE 1

*Preparation of 2-ethylmercapto-4-hydroxy-dihydro-thieno[3,2-d]pyrimidine by Method A*

8 gm. (0.05 mol) of 3-keto-tetrahydrothiophene-2-carboxylic acid methyl ester were added dropwise to a solution of 18.5 gm. (0.1 mol) of S-ethyl-iso-thiourea hydrobromide and 13.8 gm. (0.1 mol) of potassium carbonate in 50 cc. of water at room temperature, accompanied by stirring. A white crystalline substance precipitated after a short period of time. The reaction mixture was stirred at room temperature for an additional fifteen hours, vacuum filtered, and the filter cake was thoroughly washed with water. Finally, it was recrystallized from ethanol. 7.5 gm. (70% of theory) of 2-ethylmercapto-4-hydroxy-dihydrothieno[3,2-d]pyrimidine of the formula

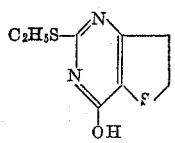

were obtained. It had a melting point of 242–243° C.

*Analysis.*—$C_8H_{10}N_2OS_2$; molecular weight=214.32. Calculated: C, 44.83%; H, 4.70%; S, 29.93%. Found: C, 45.00%; H, 4.76%; S, 29.76%.

Using a procedure analogous to that described above, the following additional dihydrothieno[3,2-d] pyrimidine substitution products were prepared:

(a) 2-ethylmercapto-4-hydroxy - 7 - methyl-dihydrothieno[3,2-d] pyrimidine of the formula

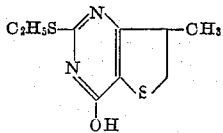

from 3-keto-4-methyl-tetrahydrothiophene-2 - carboxylic acid methyl ester and S-ethyl-isothiourea hydrobromide. Recrystallized from ethanol, the product had a melting point of 182–183° C.

(b) 2-pyrrolidino-3-hydroxy - 7 - methyl - dihydrothieno[3,2-d] pyrimidine of the formula

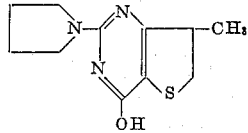

from 3-keto-4-methyl-tetrahydrothiophene - 2 - carboxylic acid methyl ester and N,N-tetramethylene-guanidine hydrochloride. Recrystallized from ethanol, the product had a melting point of 270–272° C.

(c) 2-dimethylamino-4-hydroxy - dihydrothieno[3,2-d] pyrimidine of the formula

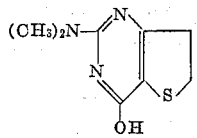

from 3-keto-tetrahydrothiophene-2-carboxylic acid methyl ester and N,N-dimethyl-guanidine sulfate. Recrystallized from dimethylformamide, the product had a melting point of 294–295° C.

(d) 2-ethylmercapto-4-hydroxy - 6 - methyl - dihydrothieno[3,2-d]pyrimidine of the formula

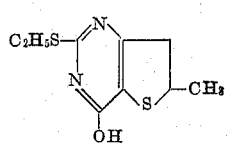

from 3-keto-5-methyl-tetrahydrothiophene - 2 - carboxylic acid methyl ester and S-ethylisothiourea hydrobromide. Recrystallized from ethanol, the product had a melting point of 210–211° C.

(e) 2-ethylmercapto-4-hydroxy - 6 - phenyl - dihydrothieno[3,2-d]pyrimidine of the formula

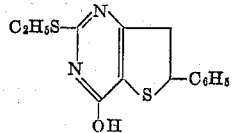

from 3-keto-5-phenyl-tetrahydrothiophene - 2 - carboxylic acid methyl ester and S-ethyl-isothiourea hydrobromide. Recrystallized from ethanol, the product had a melting point of 228–229° C.

(f) 2-ethylmercapto-4-hydroxy - 7 - phenyl - dihydrothieno[3,2-d]pyrimidine of the formula

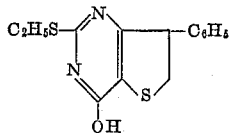

from 3-keto-4-phenyl-tetrahydrothiophene - 2 - carboxylic acid methyl ester and S-ethylisothiourea hydrobromide. Recrystallized from ethanol, the product had a melting point of 226–228° C.

(g) 2-phenyl - 4 - hydroxy-dihydrothieno[3,2-d]pyrimidine of the formula

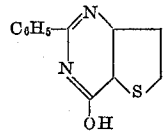

from 3-keto-tetrahydrothiophene-2-carboxylic acid methyl ester and benzamidine hydrochloride. Recrystallized from a 7:3 mixture of dimethylformamide and ethanol, the product had a melting point of 255–256° C.

EXAMPLE 2

*Preparation of 2-morpholino-4-hydroxy-dihydrothieno-[3,2-d]pyrimidine by Method B*

A mixture of 7.5 gm. (0.035 mol) of 2-ethyl-mercapto-4-hydroxy-dihydrothieno[3,2-d]pyrimidine and 50 cc. of morpholine was refluxed on an oil bath for twenty hours at 140° C. (bath temperature) while stirring. Thereafter, the reaction mixture was allowed to cool and was then poured into 150 cc. of ether. The crystalline precipitate formed thereby was separated by vacuum filtration and washed with ether. The raw product was recrystallized from dimethylformamide. 5.6 gm. (67% of theory) of white crystalline 2-morpholino-4-hydroxy-dihydrothieno[3,2-d]pyrimidine of the formula

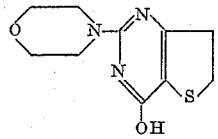

were obtained. It had a melting point of 262–265° C.

*Analysis.*—$C_{10}H_{13}N_3O_2S$: molecular weight=239.30. Calculated: C, 50.19%; H, 5.48%; N, 17.56%. Found: C, 50.00%; H, 5.46%; N, 17.39%.

Using a procedure analogous to that described above, the following additional dihydrothieno[3,2-d]pyrimidine substitution product was prepared:

(a) 2-morpholino-4-hydroxy - 7 - methyl - dihydrothieno[3,2-d]pyrimidine of the formula

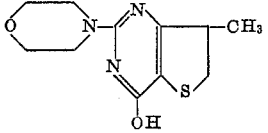

from 2-ethylmercapto-4-hydroxy-7-methyl-dihydrothieno[3,2-d]pyrimidine and morpholine. Recrystallized from dimethylformamide, the product had a melting point of 234–235° C.

(b) 2-(2'-methyl-morpholino) - 4 - hydroxy - dihydrothieno[3,2-d]pyrimidine of the formula

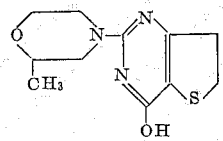

from 2-ethylmercapto - 4 - hydroxy - dihydrothieno[3,2-d]pyrimidine and 2 - methyl - morpholine. Recrystallized from dimethylformamide, the product had a melting point of 271–273° C.

EXAMPLE 3

*Preparation of 2-morpholino-4-chloro-dihydrothieno[3,2-d]pyrimidine by Method B*

A mixture of 3 gm. (0.0125 mol) of 2-morpholino-4-hydroxy-dihydrothieno[3,2-d]pyrimidine and 20 cc. of phosphorus oxychloride was refluxed for two hours. A clear solution was obtained from which the excess phosphorus oxychloride was distilled in vacuo. The viscous residue was admixed with ice water, the aqueous mixture was adjusted to a pH of 8 with 2 N sodium hydroxide and the alkaline solution was extracted with chloroform. After evaporating the chloroform extract solution, a yellow substance remained behind; it was recrystallized from ethanol. 2.5 gm. (78% of theory) of 2-morpholino-4-chloro-dihydrothieno[3,2-d]pyrimidine of the formula

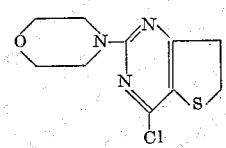

were obtained. The product had a melting point of 145–146° C.

*Analysis.*—$C_{10}H_{12}ClN_3OS$; molecular weight=257.75. Calculated: C, 46.60%; H, 4.69%; Cl, 13.76%. Found: C, 46.70%; H, 4.75%; Cl, 13.65%.

Using a procedure analogous to that described above, the following additional 4-chloro-dihydrothieno[3,2-d]pyrimidine substitution products were prepared:

(a) 2 - morpholino - 4 - chloro-7-methyl-dihydrothieno[3,2-d]pyrimidine of the formula

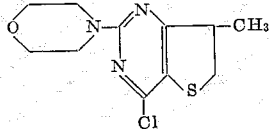

from 2 - morpholino - 4 - hydroxy-7-methyl-dihydrothieno[3,2-d]pyrimidine and phosphorus oxychloride. Recrystallized from ethanol, the product had a melting point of 78–80° C.

(b) 2 - pyrrolidino - 4 - chloro-7-methyl-dihydrothieno[3,2-d]pyrimidine of the formula

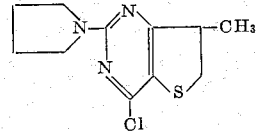

from 2 - pyrrolidino - 4 - hydroxy-7-methyl-dihydrothieno[3,2-d]pyrimidine and phosphorus oxychloride. Recrystallized from ethanol, the product had a melting point of 63–64° C.

(c) 2 - dimethylamino - 4 - chloro - 7 - methyl-dihydrothieno[3,2-d]pyrimidine of the formula

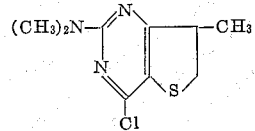

from 2-dimethylamino-4-hydroxy-7-methyl-dihydrothieno[3,2-d]pyrimidine and phosphorusoxychloride. Recrystallized from methanol, the product had a melting point of 38° C.

(d) 2 - morpholino - 4 - chloro-6-phenyl-dihydrothieno[3,2-d]pyrimidine from 2-morpholino-4-hydroxy-6-phenyl-dihydrothieno[3,2-d]pyrimidine and phosphorus oxychloride. Recrystallized from ethanol, the product had a melting point of 147–148° C.

(e) 2 - morpholino - 4 - chloro-7-phenyl-dihydrothieno[3,2-d]pyrimidine from 2-morpholino-4-hydroxy-7-phenyl-dihydrothieno[3,2-d]pyrimidine and phosphorus oxychloride. The product had a melting point of 149–150° C.

(f) 2 - (N' - methyl - piperazino)-4-chloro-dihydrothieno[3,2-d]pyrimidine of the formula

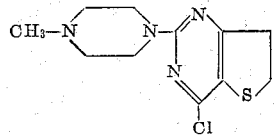

from 2-(N'-methyl-piperazino)-4-hydroxy-dihydrothieno[3,2-d]pyrimidine and phosphorus oxychloride. Recrystallized from petroleum ether, the product had a melting point of 78–79° C.

(g) 2 - ethylmercapto - 4 - chloro-dihydrothieno[3,2-d]pyrimidine from 2 - ethylmercapto - 4 - hydroxy - dihydrothieno[3,2-d]pyrimidine and phosphorus oxychloride, recrystallized from ethanol the product had a melting point of 75–76° C.

(h) 2 - (2'-methyl-morpholino)-4-chloro-dihydrothieno[3,2-d]pyrimidine from 2-(2'-methyl-morpholino)-4-hydroxy-dihydrothieno[3,2-d]pyrimidine and phosphorus oxychloride. Recrystallized from ethanol, the product had a melting point of 101–102° C.

(i) 2 - pyrrolidino - 4 - chloro-dihydrothieno[3,2-d]pyrimidine from 2-pyrrolidino-4-hydroxy-dihydrothieno[3,2-d]pyrimidine and phosphorus oxychloride. Recrystallized from ethanol, the product had a melting point of 102–103° C.

(j) 2 - dimethylamino - 4 - chloro-dihydrothieno[3,2-d]pyrimidine from 2 - dimethylamino - 4 - hydroxy-dihydrothieno[3,2-d]pyrimidine and phosphorus oxychloride. Recrystallized from ethanol, the product had a melting point of 98–99° C.

(k) 2 - ethylamino - 4 - chloro-dihydrothieno[3,2-d]pyrimidine of the formula.

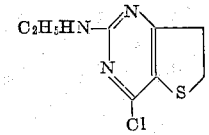

from 2-ethylamino-4-hydroxy-dihydrothieno[3,2-d]pyrimidine and phosphorus oxychloride. Recrystallized from ethanol, the product had a melting point of 124–125° C.

(l) 2-isopropylamino - 4 - chloro-dihydrothieno[3,2-d]pyrimidine from 2-isopropylamino - 4 - hydroxy-dihydrothieno[3,2 - d]pyrimidine and phosphorus oxychloride. Recrystallized from petroleum ether, the product had a melting point of 40–41° C.

(m) 2-piperidino - 4 - chloro-dihydrothieno[3,2-d]pyrimidine from 2-piperidino-4-hydroxy-dihydrothieno[3,2-d]pyrimidine and phosphorus oxychloride. Recrystallized from ethanol, the product had a melting point of 108–109° C.

(n) 2-morpholino-4-chloro - 6 - methyl-dihydrothieno [3,2-d]pyrimidine from 2-morpholino-4-hydroxy-6-methyl-dihydrothieno[3,2-d]pyrimidine and phosphorus oxychloride. Recrystallized from ethanol, the product had a melting point of 77–79° C.

(o) 2-phenyl-4-chloro-dihydrothieno[3,2-d]pyrimidine from 2-phenyl-4-hydroxy-dihydrothieno[3,2-d]pyrimidine and phosphorus oxychloride. Recrystallized from ethanol, the product had a melting point of 149–150° C.

EXAMPLE 4

*Preparation of 2,4-dimorpholino-dihydrothieno[3,2-d] pyrimidine by Method B*

A mixture of 5.14 gm. (0.02 mol) of 2-morpholino-4-chloro-dihydrothieno[3,2-d]pyrimidine and 30 cc. of morpholine was refluxed on an oil bath for four hours at 150° C. (bath temperature). Upon cooling of the clear reaction solution, the reaction product crystallized out. It was separated by vacuum filtration, washed with ether and recrystallized from ethanol. 4.2 gm. (68% of theory) of 2,4-dimorpholino-dihydrothieno[3,2-d]pyrimidine of the formula

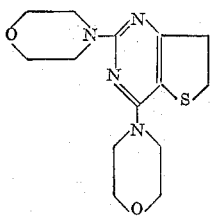

were obtained. It had a melting point of 127–128° C.

*Analysis.*—C₁₄H₂₀N₄O₂S; molecular weight=308.41. Calculated: C, 54.52%; H, 6.54%; N, 18.17%. Found: C, 54.35%; H, 6.60%; N, 18.15%.

Using a procedure analogous to that described above, the following additional 2,4-dimorpholino-dihydrothieno [3,2-d]pyrimidine substitution product was prepared:

(a) 2,4 - dimorpholino-7-methyl-dihydrothieno[3,2-d] pyrimidine from 2-morpholino-4-chloro-7-methyl-dihydrothieno[3,2-d]pyrimidine and morpholine. Recrystallized from ethanol, the product had a melting point of 125–126° C. The yield was 35% of theory.

(b) 2 - pyrrolidino-4-morpholino-dihydrothieno[3,2-d] pyrimidine from 2-pyrrolidino - 4 - chloro-dihydrothieno [3,2-d]pyrimidine and morpholine. Recrystallized from ethanol, the product had a melting point of 136–137° C. The yield was 64% of theory.

(c) 2 - (2'-methyl-morpholino)-4-morpholino-dihydrothieno[3,2-d]pyrimidine from 2-(2'-methyl-morpholino)-4-chloro-dihydrothieno[3,2-d]pyrimidine and morpholine. Recrystallized from ethanol, the product had a melting point of 118–119° C. The yield was 67% of theory.

(d) 2-dimethylamino-4-morpholino-dihydrothieno[3,2-d]pyrimidine from 2-dimethylamino-4-chloro-dihydrothieno[3,2-d]pyrimidine and morpholine. Recrystallized from ethanol, the product had a melting point of 111–112° C. The yield was 70% of theory.

(e) 2-dimethylamino - 4 - pyrrolidino - dihydrothieno [3,2-d]pyrimidine from 2-dimethylamino-4-chloro-dihydrothieno[3,2-d]pyrimidine and pyrrolidine. Recrystallized from ethanol, the product had a melting point of 125–126° C. The yield was 68% of theory.

(f) 2,4-dimorpholino - 6 - methyl-dihydrothieno[3,2-d] pyrimidine from 2-morpholino-4-chloro-6-methyl-dihydrothieno[3,2-d]pyrimidine and morpholine. Recrystallized from ethanol, the product had a melting point of 137–138° C. The yield was 70% of theory.

(g) 2,4-dimorpholino-7 - phenyl-dihydrothieno[3,2-d] pyrimidine from 2 - morpholino-4-chloro-7-phenyl-dihydrothieno[3,2-d]pyrimidine and morpholine. Recrystallized from methanol, the product had a melting point of 180–181° C. The yield was 93% of theory.

EXAMPLE 5

*Preparation of 2-morpholino-4-benzylamino-7-methyl-dihydrothieno[3,2-d]pyrimidine by Method B*

A mixture of 5.43 gm. (0.02 mol) of 2-morpholino-4-chloro-7-methyl - dihydrothieno[3,2-d]pyrimidine and 50 cc. of benzylamine was heated for five hours on an oil bath at 150° C. (bath temperature). The clear reaction solution formed thereby was allowed to cool and was then poured into water. The precipitate formed thereby was separated by vacuum filtration and washed with water. The raw product was recrystallized from ethanol. 4.3 gm. (63% of theory) of white crystalline 2-morpholino-4-benzylamino-7-methyl - dihydrothieno[3,2-d]pyrimidine of the formula

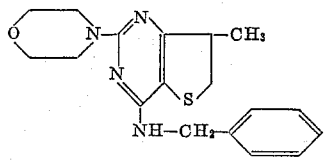

were obtained. The product had a melting point of 132–134° C.

*Analysis.*—C₁₈H₂₂N₄OS; molecular weight=342.47. Calculated: C, 63.12%; H, 6.4%; N, 16.36%. Found: C, 63.30%; H, 6.47%; N, 16.39%.

Using a procedure analogous to that described above, the following additional dihydrothieno[3,2-d]pyrimidine substitution product was prepared:

(a) 2 - morpholino - 4 - allylamino-7-methyl - dihydrothieno[3,2-d]pyrimidine of the formula

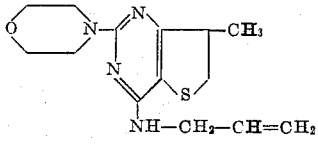

from 2 - morpholino-4-chloro-7-methyl-dihydrothieno[3, 2-d]pyrimidine and allylamine. Recrystallized from ethanol, the product had a melting point of 98–99° C. The yield was 46% of theory.

(b) 2 - morpholino - 4 - (2' - methyl-morpholino)-dihydrothieno[3,2 - d]pyrimidine from 2-morpholino-4-chloro - dihydrothieno[3,2-d]pyrimidine and 2-methyl-morpholine. Recrystallized from methanol, the product had a melting point of 87–88° C. The yield was 51% of theory.

(c) 2 - morpholino-4-piperidino-dihydrothieno[3,2-d] pyrimidine from 2 - morpholino-4-chloro-dihydrothieno [3,2-d]pyrimidine and piperidine. Recrystallized from ethanol, the product had a melting point of 108–109° C. The yield was 45% of theory.

(d) 2 - morpholino - 4-(N'-methyl-piperazino)-dihydrothieno[3,2-d]pyrimidine from 2-morpholino-4-chloro-dihydrothieno[3,2-d]pyrimidine and N-methyl-piperazine. Recrystallized from gasoline, the product had a melting point of 103–104° C. The yield was 40% of theory.

(e) 2 - morpholino - 4-cyclohexylamino-dihydrothieno [3,2-d]pyrimidine from 2-morpohlino-4-chloro-dihydrothieno[3,2-d]pyrimidine and cyclohexylamine. Recrystallized from ethanol, the product had a melting point of 134–135° C. The yield was 65% of theory.

(f) 2 - morpholino - 4-anilino-dihydrothieno[3,2-d] pyrimidine from 2 - morpholino-4-chloro-dihydrothieno [3,2-d]pyrimidine and aniline. Recrystallized from ethanol, the product had a melting point of 166–167° C. The yield was 52% of theory.

(g) 2 - morpholino - 4-benzylamino-dihydrothieno[3, 2 - d]pyrimidine from 2-morpholino-4-chloro-dihydrothieno[3,2 - d]pyrimidine and benzylamine. Recrystallized from ethanol, the product had a melting point of 138–139° C. The yield was 61% of theory.

(h) 2 - morpholino - 4-(benzyl-ethylamino)-dihydrothieno[3,2-d]pyrimidine from 2-morpholino - 4 - chloro-dihydrothieno[3,2-d]pyrimidine and benzyl-ethylamine. Recrystallized from ethanol, the product had a melting point of 92–93° C. The yield was 48% of theory.

(i) 2 - morpholino - 4-(n-propyl-amino)-dihydrothieno[3,2 - d]pyrimidine from 2-morpholino-4-chloro-dihydrothieno[3,2 - d]pyrimidine and n-propyl-amine. Recrystallized from methanol, the product had a melting point of 104–105° C. The yield was 73% of theory.

(j) 2 - morpholino - 4-(n-butylamino)-dihydrothieno [3,2 - d]pyrimidine from 2 - morpholino-4-chloro-dihydrothieno[3,2 - d]pyrimidine and n-butylamine. Recrystallized from methanol, the product had a melting point of 84–85° C. The yield was 68% of theory.

(k) 2-morpholino - 4 - (n-pentylamino)-dihydrothieno [3,2-d]pyrimidine from 2-morpholino-4-chloro-dihydrothieno[3,2-d]pyrimidine and n-pentylamine. Recrystallized from gasoline, the product had a melting point of 94–95° C. The yield was 61% of theory.

(1) 2 - morpholino - 4 - isobutylamino - dihydrothieno [3,2 - d]pyrimidine from 2 - morpholino - 4-chloro-dihydrothieno[3,2 - d]pyrimidine and isobutylamine. Recrystallized from gasoline, the product had a melting point of 122–123° C. The yield was 82% of theory.

(m) 2 - morpholino - 4 - diethanolamino-dihydrothieno[3,2 - d]pyrimidine from 2 - morpholino-4-chloro-dihydrothieno[3,2 - d]pyrimidine and diethanolamine. Recrystallized from methanol, the product had a melting point of 142–143° C. The yield was 55% of theory.

(n) 2 - morpholino - 4-ethanolamino-dihydrothieno [3,2 - d]pyrimidine from 2 - morpholino-4-chloro-dihydrothieno[3,2 - d]pyrimidine and ethanolamine. Recrystallized from methanol, the product had a melting point of 112–113° C. The yield was 59% of theory.

(o) 2 - morpholino - 4 - (methyl-ethanolamino)-dihydrothieno[3,2 - d]pyrimidine from 2 - morpholino - 4-chloro - dihydrothieno[3,2 - d]pyrimidine and methyl-ethanolamine. Recrystallized from methanol, the product had a melting point of 130–131° C. The yield was 58% of theory.

(p) 2 - pyrrolidino - 4-(2'-methyl-morpholino)-dihydrothieno[3,2 - d]pyrimidine from 2 - pyrrolidino - 4-chloro - dihydrothieno[3,2 - d]pyrimidine and 2-methyl-morpholine. Recrystallized from gasoline, the product had a melting point of 70–71° C. The yield was 48% of theory.

(q) 2,4 - di - (2'-methyl-morpholino)-dihydrothieno [3,2 - d]pyrimidine from 2 - (2'-methyl-morpholino)-4-chloro - dihydrothieno[3,2 - d]pyrimidine and 2-methyl-morpholine. Recrystallized from methanol, the product had a melting point of 103–104° C. The yield was 62% of theory.

(r) 2 - (2' - methyl - morpholino) - 4-diethanolamino-dihydrothieno[3,2 - d]pyrimidine from 2 - (2'-methyl-morpholino) - 4 - chloro - dihydrothieno[3,2-d]pyrimidine and diethanolamine. Recrystallized from methanol, the product had a melting point of 133–134° C. The yield was 48% of theory.

(s) 2 - dimethylamino - 4 - (N'-methyl-piperazino)-dihydrothieno[3,2 - d]pyrimidine from 2 - dimethylamino - 4 - chloro - dihydrothieno[3,2-d]pyrimidine and N-methyl-piperazine. Recrystallized from gasoline, the product had a melting point of 54–55° C. The yield was 62% of theory.

(t) 2 - dimethylamino - 4 - morpholino-7-methyl-dihydrothieno[3,2 - d]pyrimidine from 2 - dimethylamino-4-chloro - 7 - methyl-dihydrothieno[3,2-d]pyrimidine and morpholine. Recrystallized from methanol, the product had a melting point of 81–82° C. The yield was 61% of theory.

(u) 2 - ethylamino - 4 - morpholino-dihydrothieno[3,2 - d]pyrimidine from 2 - ethylamino-4-chloro-dihydrothieno[3,2 - d]pyrimidine and morpholine. Recrystallized from ethanol, the product had a melting point of 104–105° C. The yield was 51% of theory.

(v) 2 - ethylamino - 4 - (ethyl-benzylamino)-dihydrothieno[3,2 - d]pyrimidine from 2 - ethylamino-4-chloro-dihydrothieno[3,2 - d]pyrimidine and ethyl-benzylamine. Recrystallized from methanol, the product had a melting point of 89–90° C. The yield was 47% of theory.

(w) 2 - ethylamino - 4-(methyl-ethanolamino)-dihydrothieno[3,2 - d]pyrimidine from 2-ethylamino-4-chloro-dihydrothieno[3,2 - d]pyrimidine and methyl-ethanolamine. Recrystallized from methanol, the product had a melting point of 104–105° C. The yield was 56% of theory.

(x) 2 - isopropylamino - 4-morpholino-dihydrothieno [3,2 - d]pyrimidine from 2 - isopropylamino-4-chloro-dihydrothieno[3,2 - d]pyrimidine and morpholine. Recrystallized from 80% methanol, the product had a melting point of 90–91° C. The yield was 46% of theory.

(y) 2 - isopropylamino - 4 - pyrrolidino-dihydrothieno [3,2 - d]pyrimidine from 2 - isopropylamino-4-chloro-dihydrothieno[3,2 - d]pyrimidine and pyrrolidine. Recrystallized from methanol, the product had a melting point of 110–111° C. The yield was 40% of theory.

(z) 2 - isopropylamino - 4-(methyl-ethanolamino)-dihydrothieno[3,2 - d]pyrimidine from 2 - isopropylamino-4 - chloro - dihydrothieno[3,2-d]pyrimidine and methyl-ethanolamine. Recrystallized from acetone, the product had a melting point of 114–115° C. The yield was 34% of theory.

(aa) 2 - piperidino - 4 - diethanolamino-dihydrothieno [3,2 - d]pyrimidine from 2 - piperidino-4-chloro-dihydrothieno[3,2 - d]pyrimidine and diethanolamine. Recrystallized from ethylacetate, the product had a melting point of 117–118° C. The yield was 45% of theory.

(bb) 2 - piperidino-4-(methyl-ethanolamino)-dihydrothieno[3,2-d]pyrimidine from 2-piperidino-4-chloro-dihydrothieno[3,2-d]pyrimidine and methyl-ethanolamine. Recrystallized from ethylacetate, the product had a melting point of 76–77° C. The yield was 53% of theory.

(cc) 2 - piperidino - 4-pyrrolidino-dihydrothieno[3,2-d]pyrimidine from 2 - piperidino-4-chloro-dihydrothieno [3,2-d]pyrimidine and pyrrolidine. Recrystallized from methanol, the product had a melting point of 91–92° C. The yield was 54% of theory.

(dd) 2 - morpholino - 4 - (ethyl-ethanolamino)-dihydrothieno[3,2-d]pyrimidine from 2-morpholino-4-chloro-dihydrothieno[3,2-d]pyrimidine and ethyl-ethanolamine. Recrystallized from methanol, the product had a melting point of 129–130° C. The yield was 72% of theory.

(ee) 2 - morpholino - 4-pyrrolidino-dihydrothieno[3,2-d]pyrimidine from 2 - morpholino-4-chloro-dihydrothieno[3,2 - d]pyrimidine and pyrrolidine. Recrystallized from ethanol, the product had a melting point of 169–170° C. The yield was 65% of theory.

(ff) 2 - morpholino - 4 - (γ-methoxy-n-propyl-amino)-dihydrothieno[3,2 - d]pyrimidine from 2 - morpholino-4-chloro - dihydrothieno[3,2-d]pyrimidine and γ-methoxy-n-propylamine. Recrystallized from gasoline, the product had a melting point of 79–80° C. The yield was 61% of theory.

(gg) 2 - piperidino - 4 - morpholino-dihydrothieno [3,2 - d]pyrimidine from 2-piperidino-4-chloro-dihydrothieno[3,2-d]pyrimidine and morpholine. Recrystallized from methanol, the product had a melting point of 97–98° C. The yield was 72% of theory.

(hh) 2 - (N' - methyl-piperazino)-4-morpholino-dihydrothieno[3,2 - d]pyrimidine from 2-(N'-methyl-piperazino)-4-chloro-dihydrothieno[3,2-d]pyrimidine and morpholine. Recrystallized from hexane, the product had a melting point of 98–99° C. The yield was 54% of theory.

(ii) 2 - (N' - methyl - piperazino)-4-(methyl-ethanolamino) - dihydrothieno[3,2 - d]pyrimidine from 2-(N'-methyl - piperazino) - 4 - chloro-dihydrothieno[3,2-d] pyrimidine and methyl-ethanolamine. Recrystallized from ethylacetate, the product had a melting point of 119–120° C. The yield was 67% of theory.

(jj) 2 - dimethylamino - 4 - (2'-methyl-morpholino)-dihydrothieno[3,2 - d]pyrimidine from 2-dimethylamino-4 - chloro-dihydrothieno[3,2-d]pyrimidine and 2-methyl-morpholine. Recrystallized from 80% methanol, the product had a melting point of 64–65° C. The yield was 56% of theory.

(kk) 2 - dimethylamino - 4 - diethanolamine-dihydrothieno[3,2-d]pyrimidine from 2-dimethylamino-4-chloro-dihydrothieno[3,2-d]pyrimidine and diethanolamine. Recrystallized from ethylacetate, the product had a melting point of 128–129° C. The yield was 56% of theory.

(ll) [2 - dimethylamino - 4 - (methyl-ethanolamino)-dihydrothieno[3,2 - d]pyrimidine from 2-dimethylamino-4 - chloro-dihydrothieno[3,2-d]pyrimidine and methyl-ethanolamine. Recrystallized from acetone, the product had a melting point of 86–87° C. The yield was 57% of theory.

(mm) 2 - morpholino - 4 - pyrrolidino-6-phenyl-dihydrothieno[3,2 - d]pyrimidine from 2 - morpholino-4-chloro - 6 - phenyl - dihydrothieno[3,2-d]pyrimidine and pyrrolidine. Recrystallized from methanol, the product had a melting point of 112–113° C. The yield was 75% of theory.

EXAMPLE 6

*Preparation of 2-morpholino-4-amino-7-methyl-dihydrothieno[3,2-d]pyrimidine by Method B*

A mixture of 5.43 gm. (0.02 mol) of 2-morpholino-4-chloro - 7-methyl-dihydrothieno[3,2-d]pyrimidine and 60 cc. of liquid ammonia was heated for five hours in an autoclave on an oil bath at 120° C. (bath temperature). Thereafter, the reaction mixture was allowed to cool, the excess ammonia was distilled off, the crystalline residue was stirred with water, and the aqueous mixture was vacuum filtered. The filter cake was recrystallized from ethanol. 2.6 gm. (51% of theory) of white crystalline 2 - morpholino - 4 - amino-7-methyl-dihydrothieno[3,2-d]pyrimidine of the formula

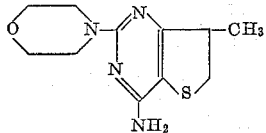

were obtained. It had a melting point of 117–118° C.

*Analysis.*—$C_{11}H_{16}N_4OS$; molecular weight=252.35. Calculated: C, 52.35%; H, 6.39%; N, 22.20%. Found: C, 52.50%; H, 6.48%; N, 22.10%.

Using a procedure analogous to that described above, the following additional dihydrothieno[3,2-d]pyrimidine substitution products were prepared:

(a) 2 - morpholino - 4 - diethylamino - 7 - methyl-dihydrothieno[3,2 - d]pyrimidine from 2-morpholino-4-chloro - 7 - methyl-dihydrothieno[3,2-d]pyrimidine and diethylamine. Recrystallized from hexane, the product had a melting point of 50–51° C. The yield was 42% of theory.

(b) 2 - morpholino - 4 - amino - dihydrothieno[3,2-d]pyrimidine from 2 - morpholino - 4-chloro-dihydrothieno[3,2-d]pyrimidine and ammonia. Recrystallized from ethanol, the product had a melting point of 165–167° C. The yield was 46% of theory.

(c) 2 - morpholino - 4 - methylamino-dihydrothieno[3,2-d]pyrimidine from 2-morpholino-4-chloro-dihydrothieno[3,2 - d]pyrimidine and methylamine. Recrystallized from methanol, the product had a melting point of 156–157° C. The yield was 42% of theory.

(d) 2 - morpholino - 4 - ethylamino - dihydrothieno[3,2 - d]pyrimidine from 2 - morpholino-4-chloro-dihydrothieno[3,2 - d]pyrimidine and ethylamine. Recrystallized from methanol, the product had a melting point of 124–125° C. The yield was 64% of theory.

(e) 2 - morpholino - 4 - allylamino - dihydrothieno[3,2 - d]pyrimidine from 2 - morpholino - 4 - chloro-dihydrothieno[3,2 - d]pyrimidine and allylamine. The product had a melting point of 107–108° C. after recrystallization from methanol. The yield was 55% of theory.

(f) 2 - morpholino - 4 - isopropylamino - dihydrothieno[3,2 - d]pyrimidine from 2 - morpholino-4-chloro-dihydrothieno[3,2-d]pyrimidine and isopropylamine. Recrystallized from gasoline, the product had a melting point of 116–117° C. The yield was 75% of theory.

(g) 2 - morpholino - 4 - dimethylamino-dihydrothieno [3,2 - d]pyrimidine from 2 - morpholino - 4 - chloro-dihydrothieno[3,2-d]pyrimidine and dimethylamine. Recrystallized from methanol, the product had a melting point of 121–122° C. The yield was 68% of theory.

(h) 2 - morpholino - 4 - diethylamino - dihydrothieno[3,2 - d]pyrimidine from 2-morpholino-4-chloro-dihydrothieno[3,2-d]pyrimidine and diethylamine. Recrystallized from gasoline, the product had a melting point of 44–45° C. The yield was 41% of theory.

(i) 2 - morpholino - 4 - di - n - propylamino - dihydrothieno[3,2-d]pyrimidine from 2-morpholino-4-chloro-dihydrothieno[3,2-d]pyrimidine and di-n-propylamine. Recrystallized from 80% methanol, the product had a melting point of 69–70° C. The yield was 51% of theory.

(j) 2 - morpholino - 4 - di - n - butylamino - dihydrothieno[3,2-d]pyrimidine from 2-morpholino-4-chloro-dihydrothieno[3,2-d]pyrimidine and di-n-butylamine. Recrystallized from 80% methanol, the product had a melting point of 45–46° C. The yield was 54% of theory.

(k) 2 - morpholino - 4 - diallylamino - dihydrothieno[3,2-d]pyrimidine from 2-morpholino-4-chloro-dihydrothieno[3,2-d]pyrimidine and diallylamine. Recrystallized from petroleum ether, the product had a melting point of 58–59° C. The yield was 39% of theory.

(l) 2 - pyrrolidino - 4 - isopropylamino - dihydrothieno[3,2-d]pyrimidine from 2-pyrrolidino-4-chloro-dihydrothieno[3,2-d]pyrimidine and isopropylamine. Recrystallized from petroleum ether, the product had a melting point of 101–102° C. The yield was 61% of theory.

(m) 2 - (2' -methyl - morpholino) - 4 - amino - dihydrothieno[3,2 - d]pyrimidine from 2-(2'-methyl-morpholino)-4-chloro-dihydrothieno[3,2-d]pyrimidine and ammonia. Recrystallized from ethanol, the product had a melting point of 165–166° C. The yield was 60% of theory.

(n) 2 - (2' - methyl - morpholino) - 4 - ethylamino-dihydrothieno[3,2-d]pyrimidine from 2-(2'-methylmorpholino) - 4 - chloro-dihydrothieno[3,2-d]pyrimidine and ethylamine. Recrystallized from methanol, the product had a melting point of 108–109° C. The yield was 55% of theory.

(o) 2 - (2' - methyl - morpholino) - 4 - allylamino - dihydrothieno[3,2-d]pyrimidine from 2-(2'-methyl-morpholino)-4-chloro-dihydrothieno[3,2-d]pyrimidine and allylamine. Recrystallized from gasoline, the product had a melting point of 85–86° C. The yield was 65% of theory.

(p) 2 - dimethylamino - 4 - amino - dihydrothieno[3,2-d]pyrimidine from 2 - dimethylamino - 4 - chloro-dihydrothieno[3,2-d]pyrimidine and ammonia. Recrystallized from methanol, the product had a melting point of 171–172° C. The yield was 55% of theory.

(q) 2 - dimethylamino - 4 - ethylamino - dihydrothieno[3,2-d]pyrimidine from 2-dimethylamino-4-chloro-dihydrothieno[3,2-d]pyrimidine and ethylamine. Recrystallized from methanol, the product had a melting point of 101–102° C. The yield was 43% of theory.

(r) 2 - dimethylamino - 4 - isopropylamino - dihydrothieno[3,2-d]pyrimidine from 2-dimethylamino-4-chloro-dihydrothieno[3,2-d]pyrimidine and isopropylamine. Recrystallized from gasoline, the product had a melting point of 86–87° C. The yield was 38% of theory.

(s) 2,4 - bis - dimethylamino - dihydrothieno[3,2 - d] pyrimidine from 2-dimethylamino-4-chloro-dihydrothieno [3,2 - d]pyrimidine and dimethylamine. Recrystallized from gasoline, the product had a melting point of 105–106° C. The yield was 46% of theory.

(t) 2 - dimethylamino - 4 - amino - 7 - methyl - dihydrothieno[3,2-d]pyrimidine from 2-dimethylamino-4-chloro-7-methyl-dihydrothieno[3,2-d]pyrimidine and ammonia. Recrystallized from ethanol, the product had a melting point of 123–124° C. The yield was 35% of theory.

(u) 2,4 - bis - dimethylamino - 7 - methyl - dihydrothieno[3,2-d]pyrimidine from 2-dimethylamino-4-chloro-7-methyl-dihydrothieno[3,2-d]pyrimidine and dimethylamine. Recrystallized from ethanol, the product had a melting point of 78–79° C. The yield was 53% of theory.

(v) 2,4-di-ethylamino-dihydrothieno[3,2 - d]pyrimidine from 2-ethylamino-4-chloro-dihydrothieno[3,2-d]pyrimidine and ethylamine. Recrystallized from 80% methanol, the product had a melting point of 116–117° C. The yield was 63% of theory.

(w) 2 - (N' - methyl - piperazino) - 4 - n - propylamino-dihydrothieno[3,2-d]pyrimidine from 2-(N'-methyl-piperazino)-4-chloro-dihydrothieno[3,2-d]pyrimidine and n-propylamine. Recrystallized from gasoline, the product had a melting point of 108–109° C. The yield was 58% of theory.

(x) 2 - (N' - methyl - piperazino) - 4 - allylamino - dihydrothieno[3,2-d]pyrimidine from 2-(N'-methyl-piperazino)-4-chloro-dihydrothieno[3,2-d]pyrimidine and allylamine. Recrystallized from petroleum ether, the product had a melting point of 84–85° C. The yield was 42% of theory.

(y) 2 - (N' - methyl - piperazino) - 4 - isopropylamino-dihydrothieno[3,2-d]pyrimidine from 2-(N'-methyl-piperazino)-4-chloro-dihydrothieno[3,2-d]pyrimidine and isopropylamine. Recrystallized from hexane, the product had a melting point of 80–81° C. The yield was 48% of theory.

(z) 2 - (N' - methyl - piperazino) - 4 - dimethylamino-dihydrothieno[3,2-d]pyrimidine from 2-(N'-methyl-piperazino)-4-chloro-dihydrothieno[3,2-d]pyrimidine and dimethylamine. Recrystallized from gasoline, the product had a melting point of 76–77° C. The yield was 51% of theory.

(aa) 2 - dimethylamino - 4 - allylamino - dihydrothieno[3,2-d]pyrimidine from 2-dimethylamino-4-chloro-dihydrothieno[3,2-d]pyrimidine and allylamine. Recrystallized from petroleum ether, the product had a melting point of 86–87° C. The yield was 72% of theory.

(bb) 2 - morpholino - 4 - dimethylamino - 6 - methyl-dihydrothieno[3,2-d]pyrimidine from 2 - morpholino - 4-chloro-6-methyl-dihydrothieno[3,2-d]pyrimidine and dimethylamine. Recrystallized from petroleum ether, the product had a melting point of 75–76° C. The yield was 62% of theory.

(cc) 2 - morpholino - 4 - n - propylamino - 6 - methyl-dihydrothieno[3,2-d]pyrimidine from 2 - morpholino - 4-chloro-6-methyl-dihydrothieno[3,2-d]pyrimidine and n-propylamine. Recrystallized from petroleum ether, the product had a melting point of 76–77° C. The yield was 71% of theory.

(dd) 2 - morpholino - 4 - isopropylamino - 6 - phenyl-dihydrothieno[3,2-d]pyrimidine from 2 - morpholino - 4-chloro-6-phenyl-dihydrothieno[3,2-d]pyrimidine and isopropylamine. Recrystallized from ethanol, the product had a melting point of 151–152° C. The yield was 69% of theory.

(ee) 2 - morpholino - 4 - diethylamino - 7 - phenyl - dihydrothieno[3,2 - d]pyrimidine from 2 - morpholino - 4-chloro-7-phenyl-dihydrothieno[3,2-d]pyrimidine and diethylamine. Recrystallized from ethanol, the product had a melting point of 97–98° C. The yield was 46% of theory.

EXAMPLE 7

*Preparation of 2-pyrrolidino-4-(2'-methyl-morpholino)-7-methyl-dihydrothieno[3,2-d]pyrimidine hydrochloride*

Ethereal hydrochloric acid was added to a solution of 1.6 gm. (0.005 mol) of 2-pyrrolidino-4-(2'-methyl-morpholino)-7-methyl-dihydrothieno[3,2-d]pyrimidine in 50 cc. of absolute ethylacetate until the solution was acid to Congo red. The precipitate formed thereby was separated by vacuum filtration, washed with a small amount of absolute ethylacetate and recrystallized from absolute isopropanol. 1.3 gm. (73% of theory) of the hydrochloric acid addition salt of 2-pyrrolidino-4-(2'-methyl-morpholino)-7-methyl-dihydrothieno[3,2-d]pyrimidine of the formula

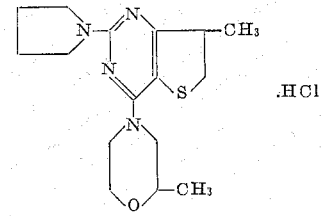

were obtained in the form of white crystals. The salt had a melting point of 195–197° C.

*Analysis.*—$C_{16}H_{25}ClN_4OS$; molecular weight=356.93. Calculated: C, 53.85%; H, 7.06%; Cl, 9.93%. Found: C, 54.00%; H, 7.12%; Cl 9.76%.

In a manner analogous to that described above, the hydrochlorides of the following other dihydrothieno[3,2-d]pyrimidines were prepared:

(a) 2-morpholino - 4 - (3' - dimethylamino-n-propylamino)-dihydrothienol[3,2-d]pyrimidine trihydrochloride of the formula from the free base and ethereal hydrochloric acid. Recrystallized from absolute methanol, the salt had a melting point of 147–149° C.

(b) 2-piperidino-4-diethylamino - dihydrothieno[3,2-d]pyrimidine hydrochloride from the free base and ethereal hydrochloric acid. Recrystallized from abosolute ethylacetate, the salt had a melting point of 141–142° C.

(c) 2-(N'-methyl-piperazino)-4-ethylamino - dihydrothieno [3,2-d]pyrimidine dihydrochloride from the free base and ethereal hydrochloric acid. Recrystallized from absolute ethanol, the salt had a melting point of 288–289° C.

EXAMPLE 8

*Preparation of 2-pyrrolidino-4-hydrazino-7-methyl-dihydrothieno[3,2-d]pyrimidine by Method B*

3.2 gm. (0.0125 mol) of 2-pyrrolidino-4-chloro-7-methyl-dihydrothieno[3,2-d]pyrimidine were dissolved in 50 cc. of ethanol. 50 cc. of 80% hydrazine hydrate were added to the solution, and the resulting mixture was refluxed for four hours. Upon cooling of the clear reaction solution, a precipitate formed, which was separated by vacuum filtration and washed with ethanol. 2.4 gm. (76% of theory) of analytically pure 2-pyrrolidino-4-hydrazino-7-methyl - dihydrothieno[3,2-d]pyrimidine of the formula were obtained. It had a melting point of 148–149° C.

*Analysis.* — $C_{11}H_{17}N_5S$; molecular weight=251.36. Calculated: C, 52.55%; H, 6.82%; N, 27.86%. Found: C, 52.60%; H, 6.81%; N, 27.75%.

(a) Using a procedure analogous to that described above, 2-morpholino - 4 - hydrazino-dihydrothieno[3,2-d]pyrimidine was prepared from 2-morpholino-4-chloro-dihydrothieno[3,2-d]pyrimidine and 80% hydrazine hydrate. The product had a melting point of 166–167° C.

EXAMPLE 9

*Preparation of 2-morpholino-4-isopropoxy-7-methyl-dihydrothieno[3,2-d]pyrimidine by Method B*

5.43 gm. (0.02 mol) of 2-morpholino-4-chloro-7-methyl-dihydrothieno[3,2-d]pyrimidine were added to a solution of 0.5 gm. (0.022 gm.-atom) of sodium in 50 cc. of absolute isopropanol, i.e., a solution of sodium isopropylate in isopropanol, and the mixture was refluxed for three hours. Upon cooling of the reaction solution, a crystalline precipitate formed which was separated by vacuum filtration, thoroughly washed with water and recrystallized from isopropanol. 3.4 gm. (58% of theory) of white crystalline-2-morpholino-4-isopropoxy-7-methyl-dihydrothieno[3,2-d]pyrimidine of the formula

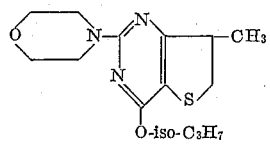

were obtained. It had a melting point of 79–80° C.

*Analysis.*—$C_{14}H_{21}N_3O_2S$; molecular weight=295.41. Calculated: C, 56.92%; H, 7.17%; N, 14.23%. Found: C, 56.76%; H, 7.34%; N, 14.38%.

Using a procedure analogous to that described above, the following additional 2-basic-4-alkoxy-substituted dihydrothieno[3,2-d]pyrimidines were prepared:

(a) 2 - dimethylamino - 4 - ethoxy-7-methyl-dihydrothieno[3,2-d]pyrimidine from 2-dimethylamino-4-chloro-7 - methyl - dihydrothieno[3,2-d]pyrimidine and sodium ethylate. Recrystallized from petroleum ether, the product had a melting point of 39–40° C. The yield was 48% of theory.

(b) 2-morpholino - 4 - methoxy-dihydrothieno[3,2-d]pyrimidine from 2 - morpholino-4-chloro-dihydrothieno-[3,2-d]pyrimidine and sodium methylate. Recrystallized from ethanol, the product had a melting point of 134–135° C. The yield was 57% of theory.

(c) 2-morpholino - 4 - ethoxy - dihydrothieno[3,2-d]pyrimidine from 2 - morpholino-4-chloro-dihydrothieno-[3,2-d]pyrimidine and sodium ethylate. Recrystallized from ethanol, the product had a melting point of 92–93° C. The yield was 54% of theory.

(d) 2 - morpholino - 4 - allyloxy-dihydrothieno[3,2-d]pyrimidine from 2-morpholino - 4 - chloro-dihydrothieno-[3,2-d]pyrimidine and sodium allylate. Recrystallized from ethanol, the product had a melting point of 101–102° C. The yield was 52% of theory.

(e) 2-morpholino-4-isopropoxy - dihydrothieno[3,2-d]pyrimidine from 2 - morpholino-4-chloro-dihydrothieno-[3,2-d]pyrimidine and sodium isopropylate. Recrystallized from methanol, the product had a melting point of 80–81° C. The yield was 63% of theory.

(f) 2 - (2'-methyl-morpholino)-4-ethoxy-dihydrothieno[3,2 - d]pyrimidine from 2 - (2'-methyl-morpholino)-4-chloro-dihydrothieno[3,2-d]pyrimidine and sodium ethylate. Recrystallized from methanol, the product had a melting point of 68–69° C. The yield was 62% of theory.

(g) 2 - pyrrolidino - 4 - ethoxy - dihydrothieno[3,2-d]pyrimidine from 2 - pyrrolidino - 4-chloro-dihydrothieno[3,2-d]pyrimidine and sodium ethylate. Recrystallized from ethanol, the product had a melting point of 86.87° C. The yield was 73% of theory.

(h) 2 - dimethylamino-4-methoxy-dihydrothieno[3,2-d]pyrimidine from 2-dimethylamino-4-chloro-dihydrothieno[3,2-d]pyrimidine and sodium methylate. Recrystallized from methanol, the product had a melting point of 71–72° C. The yield was 44% of theory.

(i) 2 - morpholino - 4-n-propoxy-dihydrothieno[3,2-d]pyrimidine from 2 - morpholino - 4-chloro-dihydrothieno[3,2-d]pyrimidine and sodium propylate. Recrystallized from methanol, the product had a melting point of 83–84° C. The yield was 56% of theory.

(j) 2 - morpholino - 4 - n-butoxy-dihydrothieno[3,2-d]pyrimidine from 2 - morpholino - 4 - chloro-dihydrothieno[3,2-d]pyrimidine and sodium butylate. Recrystallized from methanol, the product had a melting point of 69–70° C. The yield was 73% of theory.

(k) 2 - morpholino - 4-isobutoxy-dihydrothieno[3,2-d]pyrimidine from 2 - morpholino - 4-chloro-dihydrothieno[3,2-d]pyrimidine and sodium isobutylate. Recrystallized from methanol, the product had a melting point of 89–90° C. The yield was 48% of theory.

(l) 2 - morpholino-4-isoamyloxy-dihydrothieno[3,2-d]pyrimidine from 2 - morpholino - 4-chloro-dihydrothieno[3,2-d]pyrimidine and sodium isoamylate. Recrystallized from methanol, the product had a melting point of 77–78° C. The yield was 44% of theory.

(m) 2 - morpholino - 4 - (2'-ethoxy-ethoxy)-dihydrothieno[3,2-d]pyrimidine from 2-morpholino-4-chloro-dihydrothieno[3,2-d]pyrimidine and sodium 2-ethoxy-ethylate. Recrystallized from gasoline, the product had a melting point of 82–83° C. The yield was 38% of theory.

(n) 2 - dimethylamino - 4-ethoxy-dihydrothieno[3,2-d]pyrimidine from 2-dimethylamino-4-chloro-dihydrothieno[3,2-d]pyrimidine and sodium ethylate. Recrystallized from hexane, the product had a melting point of 63–64° C. The yield was 46% of theory.

(o) 2 - morpholino - 4-ethoxy-6-phenyl-dihydrothieno[3,2-d]pyrimidine from 2-morpholino-4-chloro-6-phenyl-dihydrothieno[3,2 - d]pyrimidine and sodium ethylate. Recrystallized from ethylacetate, the product had a melting point of 220° C. The yield was 32% of theory.

EXAMPLE 10

*Preparation of 2,4-dimorpholino-dihydrothieno[3,2-d] pyrimidine maleate*

3.08 gm. (0.01 mol) of 2,4-dimorpholino-dihydrothieno[3,2-d]pyrimidine were dissolved in 75 cc. of warm absolute ethanol. 1.16 gm. (0.01 mol) of maleic acid were added to the solution, and the mixture was evaporated to dryness in vacuo. The oily residue crystallized upon stirring with absolute isopropanol. The crystalline salt was recrystallized from absolute isopropanol, whereupon it had a melting point of 134–135° C. The yield was 3.2 gm. (75% of theory).

*Analysis.*—$C_{18}H_{24}N_4O_6S$; molecular weight=424.49. Calculated: C, 50.93%; H, 5.70%; N, 13.20%. Found: C, 51.10%; H, 5.85%; N, 13.04%.

EXAMPLE 11

*Preparation of 2-pyrrolidino-4-hydroxy-dihydrothieno [3,2-d]pyrimidine by Method B*

A mixture of 4.3 gm. (0.02 mol) of 2-ethylmercapto-4-hydroxy-dihydrothieno[3,2-d]pyrimidine and 60 cc. of pyrrolidine was heated for twenty hours in a closed vessel on an oil bath at 140° C. (bath temperature). Thereafter, the contents of the vessel were allowed to cool to room temperature and were then poured into water. The aqueous mixture was acidified with glacial acetic acid; the precipitate formed thereby was separated by vacuum filtration, washed with water and recrystallized from dimethylformamide. 3.4 gm. (76% of theory) of a white crystalline substance having a melting point of 310–311° C. were obtained, which was identified to be the compound of the formula

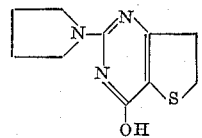

*Analysis.*—$C_{10}H_{13}N_3OS$; molecular weight 223.30. Calculated: C, 53.79%; H, 5.87%; S, 14.36%. Found: C, 53.98%; H, 5.98%; S, 14.40%.

Using a procedure analogous to that described, the following additional 2-basic-4-hydroxy-substituted dihydrothieno[3,2-d]pyrimidines were prepared:

(a) 2 - ethylamino - 4 - hydroxy-dihydrothieno[3,2-d]pyrimidine from 2 - ethylmercapto - 4-hydroxy-dihydrothieno[3,2-d]pyrimidine and ethylamine. Recrystallized from dimethylformamide, the product had a melting point of 295–296° C.

(b) 2 - isopropylamino-4-hydroxy-dihydrothieno[3,2-d]pyrimidine from 2 - ethylmercapto - 4 - hydroxy-dihydrothieno[3,2-d]pyrimidine and isopropylamine. Recrystallized from ethanol, the product had a melting point of 280–281° C.

(c) 2 - dimethylamino - 4-hydroxy-7-methyl-dihydrothieno[3,2-d]pyrimidine from 2-ethylmercapto-4-hydroxy-7-methyl-dihydrothieno[3,2-d]pyrimidine and dimethylamine. Recrystallized from dimethylformamide, the product had a melting point of 250–251° C.

(d) 2-piperidino - 4 - hydroxy-dihydrothieno[3,2-d]pyrimidine from 2-ethylmercapto-4-hydroxy-dihydrothieno[3,2-d]pyrimidine and piperidine. Recrystallized from dimethylformamide, the product had a melting point of 268–269° C.

EXAMPLE 12

*Preparation of 2-morpholino-4-hydroxy-dihydrothieno[3,2-d]pyrimidine by Method B*

A mixture of 4.28 gm. (0.02 mol) of 2-ethyl-mercapto-4-hydroxy-dihydrothieno[3,2-d]pyrimidine and 29 gm. (0.2 mol) of morpholine acetate was heated for one hour on an oil bath at 180° C. (bath temperature). Thereafter, the reaction mixture was poured into water, the precipitate formed thereby was separated by vacuum filtration, and the filter cake was washed with water and recrystallized from dimethylformamide. 4.1 gm. (85% of theory) of the compound of the formula

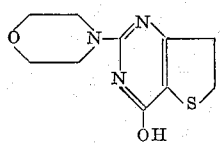

were obtained. It had a melting point of 262–265° C.

*Analysis.*—$C_{10}H_{13}N_3O_2S$; molecular weight 239.30. Calculated: C, 50.19%; H, 5.48%; N, 17.56%. Found: C, 50.07%; H, 5.54%; N, 17.48%.

Using a procedure analogous to that described above, the following additional 2-heterocyclic-4-hydroxy-substituted dihydrothieno[3,2-d]pyrimidines were prepared:

(a) 2 - morpholino - 4 - hydroxy - 6 - methyl-dihydrothieno[3,2 - d]pyrimidine from 2 - ethylmercapto - 4-hydroxy-6-methyl-dihydrothieno[3,2-d]pyrimidine and morpholine acetate. Recrystallized from ethanol, the product had a melting point of 241–243° C.

(b) 2 - morpholino - 4 - hydroxy - 6 - phenyl-dihydrothieno[3,2-d]pyrimidine from 2 - ethylmercapto - 4 - hydroxy - 6 - phenyl - dihydrothieno[3,2-d]pyrimidine and morpholine acetate. Recrystallized from ethanol, the product had a melting point of 245–249° C.

(c) 2 - morpholino - 4 - hydroxy - 7 - phenyl - dihydrothieno[3,2-d]pyrimidine from 2 - ethylmercapto - 4 - hydroxy-7-phenyl-dihydrothieno[3,2-d]pyrimidine and morpholine acetate. Recrystallized from ethanol, the product had a melting point of 251–253° C.

(d) 2 - (N' - methyl - piperazino) - 4 - hydroxy - dihydrothieno[3,2-d]pyrimidine from 2 - ethylmercapto-4-hydroxy - dihydrothieno[3,2-d]pyrimidine and N-methyl-piperazine acetate. Recrystallized from a mixture of dimethylformamide and ethanol (8:2), the product had a melting point of 258–259° C.

EXAMPLE 13

*Preparation of 2 - ethylmercapto - 4 - n - butylamino-dihydrothieno[3,2-d]pyrimidine and its hydrochloride by Method B*

A mixture of 2.2 gm. (0.0095 mol) of 2-ethylmercapto-4-chloro-dihydrothieno[3,2-d]pyrimidine and 15 cc. of n-butylamine was refluxed for three hours on a boiling water bath. Thereafter, the reaction solution was allowed to cool and was then poured into water. The oil precipitated thereby was extracted with ether, and the ether extract solution was washed several times with water and was dried over sodium sulfate. It was found to be an ethereal solution of 2-ethylmercapto-4-n-butylamino-dihydrothieno[3,2-d]pyrimidine. Ethereal hydrochloric acid was added to the solution of the free base until it was acid to Congo red. The precipitate formed thereby was separated by vacuum filtration, washed with absolute ether, and recrystallized from absolute ethanol. 2.1 gm. (72% of theory) of a white crystalline substance having a melting point of 260–262° C. were obtained. It was identified to be the compound of the formula

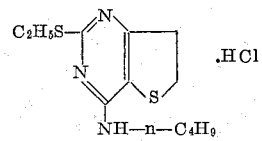

*Analysis.*—$C_{12}H_{20}ClN_3S_2$; molecular weight=305.90. Calculated: C, 47.12%; H, 6.58%; Cl, 11.60%. Found: C, 47.35%; H, 6.68%; Cl, 11.43%.

EXAMPLE 14

*Preparation of 2 - ethylmercapto - 4 - ethoxy - dihydrothieno[3,2-d]pyrimidine by Method B*

2.2 gm. (0.0095 mol) of 2 - ethylmercapto-4-chloro-dihydrothieno[3,2-d]pyrimidine were added to an ethanolic solution of sodium ethylate, obtained by dissolving 0.46 gm. (0.02 gm.-atom) of sodium in 30 cc. of absolute ethanol. The resulting mixture was refluxed for five hours and was then allowed to cool. The cool reaction solution was admixed with water, whereby an oily product separated out which crystallized after a short period of time. The crystalline product was separated by vacuum filtration, washed with water and dried. After recrystallization from petroleum ether, 1.8 gm. (78% of theory) of a white crystalline substance having a melting point of 62–63° C. were obtained. It was identified to be the compound of the formula

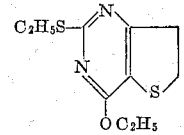

*Analysis.*—$C_{10}H_{14}N_2OS_2$; molecular weight=242.37. Calculated: C, 49.55%; H, 5.83%; S, 26.46%. Found: C, 49.37%; H, 5.91%; S, 26.45%.

EXAMPLE 15

*Preparation of 2 - phenyl - 4 - morpholino-dihydrothieno[3,2-d]pyrimidine by Method B*

A mixture of 2.0 gm. (0.008 mol) of 2-phenyl-4-chloro-dihydrothieno[3,2-d]pyrimidine and 20 cc. of morpholine was refluxed for two hours on an oil bath at 150° C. (bath temperature). Thereafter, the reaction solution was allowed to cool, whereupon it was poured into water. An oily product separated out, which crystallized after a short period of time. The crystalline precipitate was separated by vacuum filtration, washed with water, and recrystallized from ethanol. 1.7 gm. (71% of theory) of a crystalline substance having a melting point of 108–

109° C. were obtained. It was identified to be the compound of the formula

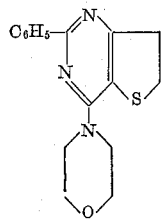

*Analysis.*—$C_{16}H_{17}N_3OS$; molecular weight=299.41. Calculated: C, 64.19%; H, 5.72%; S, 10.71%. Found: C, 64.40%; H, 5.81%; S, 10.74%.

The compounds of the present invention, that is, the dihydrothieno[3,2-d]pyrimidines embraced by Formula I above, their non-toxic pharmacologically acceptable acid addition salts, and their alkali metal salts have useful properties. More particularly, the compounds of the present invention exhibit cardiovascular, and sedative activities. The term "cardiovascular" includes both coronary vascular dilating and peripheral vascular dilating activities.

Typical examples of pharmacologically acceptable non-toxic acid addition salts are the hydrochlorides, hydrobromides, hydroiodides, sulfates, phosphates, nitrates, acetates, propionates, butyrates, valerates, oxalates, malonates, succinates, maleates, fumarates, lactates, tartrates, citrates, malates, benzoates, phthalates, cinnamates, salicylates, nicotinates, 2-furoates, 8-chlorotheophyllinates and the like.

For pharmacological purposes, the compounds of the present invention may be administered perorally or parenterally as active ingredients in customary dosage unit compositions, that is, compositions consisting essentially of an inert, physiologically compatible carrier having distributed therein one dosage unit of the active ingredient. One dosage unit of the compounds of the present invention is 10 to 200 mgm., preferably 20 to 100 mgm. Typical examples of such dosage unit compositions are tablets, coated pills, hypodermic solutions, rectal suppositories, suspensions or solutions adapted for administration per os, gelatin capsules, wafer capsules and the like.

The following examples illustrate various dosage unit compositions comprising compounds of the present invention as active ingredients. The parts are parts by weight unless otherwise specified.

EXAMPLE 16

*Tablets.*—The tablets are compounded from the following ingredients:

| | Parts |
|---|---|
| 2 - dimethylamino - 4 - morpholino - dihydrothieno[3,2-d]pyrimidine | 100.0 |
| Lactose | 80.0 |
| Potato starch, undried | 10.0 |
| Potato starch, dried | 16.0 |
| Polyvinylpyrrolidone | 10.0 |
| Colloidal silicic acid | 2.0 |
| Magnesium stearate | 2.0 |
| Total | 220.0 |

*Compounding procedures.*—The dihydrothieno - pyrimidine compound, the lactose and dried potato starch are admixed with each other, and the mixture is moistened with a 20% aqueous solution of the polyvinylpyrrolidone. The moistened mixture is then granulated by passing it through a 1.5 mm.-mesh screen, and the moist granulate is dried at 40° C. The dry granulate is once again passed through the screen, and then the remainder of the ingredients are added and thoroughly admixed. The resulting mixture is pressed into tablets each weighing 220 mgm. Each tablet contains 100 mgm. of the active ingredient.

EXAMPLE 17

*Hypodermic solution.*—The solution is compounded from the following ingredients:

| | | |
|---|---|---|
| 2,4 - dimorpholino - dihydrothieno[3',2 - d]pyrimidine | parts | 10.0 |
| Tartaric acid | do | 10.0 |
| Polyethyleneglycol 600 | do | 100.0 |
| Distilled water, q.s. ad | parts by vol | 2000.0 |

*Compounding procedure.*—The polyethyleneglycol is melted and is admixed with about double its volume of distilled water. The mixture is then heated to 80° C. and the tartaric acid and the dihydrothieno-pyrimidine compound are dissolved therein one after the other. The mixture is then cooled to room temperature, diluted with distilled water to the desired volume, and the solution is filtered until free from suspended particles. The filtered solution is filled into brown 2 cc. ampules, which are then sterilized for 30 minutes at 100° C. and sealed. Each ampule contains 10 mgm. of the active ingredient. All of the above operations must be carried out in an atmosphere of nitrogen and under exclusion of strong direct light.

EXAMPLE 18

*Coated pills.*—The pill cores are compounded from the following ingredients:

| | Parts |
|---|---|
| 2,4 - dimorpholino - dihydrothieno[3,2 - d]pyrimidine | 25.0 |
| Second, calcium phosphate | 75.0 |
| Corn starch | 21.0 |
| Gelatin | 4.0 |
| Talcum | 4.0 |
| Magnesium stearate | 1.0 |
| Total | 130.0 |

*Compounding procedure.*—The dihydrothieno - pyrimidine compound, the calcium phosphates and the corn starch are admixed with each other, and the mixture is moistened with an aqueous 14% solution of the gelatin. The moist mixture is granulated by passing it through a 1.5 mm.-mesh screen. The moist granulate is dried at 40° C. and is again passed through the screen. The dry granulate is admixed with the talcum and the magnesium stearate, and the mixture is pressed into 130 mgm. tablets, which are then provided with a coating consisting essentially of sugar and talcum. The coated pills are then polished with beeswax. Each pill weighs about 200 mgm. and contains 25 mgm. of the active ingredient.

EXAMPLE 19

*Suppositories.*—The suppositories are compounded from the following ingredients:

| | Parts |
|---|---|
| 2-dimethylamino - 4 - morpholino - dihydrothieno [3,2-d]pyrimidine | 200.0 |
| Suppository base (cocoa butter) | 1550.0 |
| Total | 1750.0 |

*Compounding procedure.*—The suppository base is melted and cooled to 37° C. and the finely powdered dihydrothieno-pyrimidine compound is stirred into it. The mixture is homogenized and poured into cooled suppository molds each holding 1750 mgm. of the mixture. Each suppository contains 200 mgm. of the active ingredient.

EXAMPLE 20

*Drop solution for peroral administration.*—The solution is compounded from the following ingredients:

| | | |
|---|---|---|
| 2,4 - dimorpholino - dihydrothieno[3,2 - d]pyrimidine | parts | 10.0 |
| Tartaric acid | do | 10.0 |
| Cane sugar | do | 350.0 |
| Sorbic acid | do | 1.0 |
| Cocoa essence | do | 50.0 |
| Ethanol | parts by volume | 200.0 |
| Polyethyleneglycol 600 | do | 100.0 |
| Distilled water, q.s. ad | do | 1000.0 |

*Compounding procedure.*—The sorbic acid is dissolved in the ethanol, and an equal amount of distilled water is added to the solution. The dihydrothieno-pyrimidine compound and the tartaric acid are dissolved in the aqueous solution while stirring (solution A). The cane sugar is dissolved in the residual amount of water (solution B). Solution B, the polyethyleneglycol and the essence of cocoa are added to solution A while stirring. The resulting mixed solution is then filtered through a suitable filter. 1 cc. of the solution contains 10 mgm. of the active ingredient.

EXAMPLE 21

*Gelatin capsules.*—The contents of the capsules are compounded from the following ingredients:

| | Parts |
|---|---|
| 2-morpholino-4-isopropoxy - dihydrothieno[3,2-d] pyrimidine | 20.0 |
| Lactose | 60.0 |
| Talcum | 20.0 |
| Total | 100.0 |

*Compounding procedure.*—The dihydrothieno-pyrimidine compound is thoroughly admixed with the other ingredients and the mixture is forced through a 1.00 mm.-mesh screen. The screened mixture is then filled into gelatin capsules each holding 100 mgm. of the mixture. Each capsule contains 20 mgm. of the active ingredient.

EXAMPLE 22

*Wafer capsules.*—The contents of the capsules are compounded from the following ingredients:

| | Parts |
|---|---|
| 2-pyrrolidino-4-(2' - methylmorpholino) - dihydrothieno[3,2-d]pyrimidine | 200.0 |
| Colloidal silicic acid | 20.0 |
| Total | 220.0 |

*Compounding procedure.*—The dihydrothieno-pyrimidine compound and the silicic acid are thoroughly admixed with each other, and the mixture is passed through a 1.0 mm.-mesh screen. The screened mixture is then filled into wafer capsules, each holding 220 mgm. of the mixture. Each capsule contains 200 mgm. of the active ingredient.

Although the dosage unit composition examples given above illustrate only a limited number of the compounds of the invention as active ingredients, it should be understood that any of the other compounds embraced by Formula I or their non-toxic acid addition or alkali metal salts may be substituted for the particular compounds used as active ingredients in Examples 16 to 22. Moreover, it should be understood that the quantities of the active ingredients in the illustrative dosage unit compositions may be varied within the dosage unit range limits indicated above to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:

1. A compound selected from the group consisting of dihydrothieno-pyrimidines of the formula

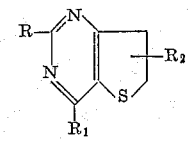

wherein

R is selected from the group consisting of phenyl, lower alkyl-mercapto, mono-lower alkyl-amino, di-lower alkyl-amino, pyrrolidino, piperidino, morpholino, 2-lower alkyl-morpholino and N'-lower alkyl-piperazino, $R_1$ is selected from the group consisting of halogen, hydroxyl, lower alkoxy, lower alkoxy-lower alkoxy, lower alkenyloxy, amino, hydrazino, mono-lower alkyl-amino, mono-lower alkenyl-amino, di-lower alkyl-amino, anilino, cyclohexylamino, benzylamino, (di-lower alkylamino)-lower alkylamino, (lower alkoxy-lower alkyl)-amino, mono - (hydroxy - lower alkyl)-amino, di-(hydroxy-lower alkyl)-amino, (hydroxy-lower alkyl)-lower alkylamino, lower alkyl-benzylamino, pyrrolidino, piperidino, morpholino, 2-lower alkyl-morpholino and N'-lower alkyl-piperazino, and $R_2$ is selected from the group consisting of hydrogen, lower alkyl and phenyl and their non-toxic, pharmacologically acceptable acid addition salts.

2. A compound selected from the group consisting of 2,4-dimorpholino-dihydroethieno[3,2-d] - pyrimidine and its non-toxic, pharmacologically acceptable acid addition salts.

3. A compound selected from the group consisting of 2-morpholino-4-isopropoxy-dihydrothenio[3,2-d] - pyrimidine and its non-toxic, pharmacologically acceptable acid addition salts.

4. A compound selected from the group consisting of 2-dimethylamino-4 - morpholino - dihydrothieno[3,2 - d]-pyrimidine and its non-toxic, pharmacologically acceptable acid addition salts.

5. A compound selected from the group consisting of 2-(N'-methylpiperazino) - 4 - ethylamino - dihydrothieno-[3,2-d]pyrimidine and its non-toxic, pharmacologically acceptable acid addition salts.

6. A compound selected from the group consisting of 2-(N'-methylpiperazine)-4 - isopropylamino - dihydrothieno[3,2-]pyrimidine and its non-toxic, pharmacologically acceptable acid addition salts.

References Cited by the Examiner

UNITED STATES PATENTS 3,244,594    4/1966    Csaba et al. _____ 167—74

ALEX MAZEL, *Primary Examiner.*

JOSE TOVAR, *Assistant Examiner.*